United States Patent
Sharpe et al.

(10) Patent No.: US 11,593,534 B2
(45) Date of Patent: Feb. 28, 2023

(54) PROPELLER DESIGN SYSTEMS AND METHODS

(71) Applicant: Massachusetts Institute of Technology, Cambridge, MA (US)

(72) Inventors: Peter Sharpe, Lexington, MA (US); Keegan Quigley, Cambridge, MA (US); Thomas Sebastian, Maynard, MA (US); Joseph Belarge, Chelmsford, MA (US); Ryan Fontaine, Waltham, MA (US); David Maurer, Stoneham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 171 days.

(21) Appl. No.: 17/002,387

(22) Filed: Aug. 25, 2020

(65) Prior Publication Data
US 2021/0141947 A1 May 13, 2021

Related U.S. Application Data

(60) Provisional application No. 62/891,462, filed on Aug. 26, 2019.

(51) Int. Cl.
*G06F 30/20* (2020.01)
*G06F 30/10* (2020.01)
(Continued)

(52) U.S. Cl.
CPC ............. *G06F 30/10* (2020.01); *G06F 30/20* (2020.01); *G06F 30/25* (2020.01); *G06F 30/27* (2020.01);
(Continued)

(58) Field of Classification Search
CPC ...... G06F 30/10; G06F 30/20; G06F 2111/04; G06F 2111/20; G06F 30/25; G06F 30/27;
(Continued)

(56) References Cited

U.S. PATENT DOCUMENTS 7,236,914 B1 * 6/2007 Zyskowski ............. G06F 30/15
434/30
7,845,902 B2 * 12/2010 Merchant .................. F02K 3/06
415/181

(Continued)

OTHER PUBLICATIONS

K. P. D'Epagnier "A Computational Tool for the Rapid Design and Prototyping of Propellers for Underwater Vehicle" pp. 1-95, (Year: 2007).*

(Continued)

*Primary Examiner* — Rehana Perveen
*Assistant Examiner* — Kibrom K Gebresilassie
(74) *Attorney, Agent, or Firm* — Barnes & Thornburg LLP

(57) ABSTRACT

Processes for optimizing the geometry of a blade for use in a propeller are disclosed. In one exemplary process, an optimization routine that generates new blade geometries based on structural parameters and calculates performance parameters of each blade geometry, including aerodynamic performance parameters, farfield acoustic parameters, and/or electrical power requirements to operate a propeller having the blade geometry, is performed. The optimization routine receives design parameters and weightings from a user and can use one or more surrogate algorithms to map a design space of the weighted values of the design parameters to find their local minima. The optimization routine then determines an optimized blade geometry using a gradient-based algorithm to generate new blade geometries to explore the minima until the weighted values of the design param- (Continued)

eters converge at an optimized blade geometry representing the global minima of the design space.

21 Claims, 8 Drawing Sheets

(51) Int. Cl.
*G06F 111/04* (2020.01)
*G06F 111/20* (2020.01)
*G06F 30/25* (2020.01)
*G06F 30/27* (2020.01)
*G06F 119/22* (2020.01)
*G06F 111/00* (2020.01)

(52) U.S. Cl.
CPC ....... *G06F 2111/00* (2020.01); *G06F 2111/04* (2020.01); *G06F 2111/20* (2020.01); *G06F 2119/22* (2020.01)

(58) Field of Classification Search
CPC ... G06F 30/28; G06F 2111/00; G06F 2119/22
See application file for complete search history.

(56) References Cited

U.S. PATENT DOCUMENTS

| | | |
|---|---|---|
| 2014/0308124 A1 | 10/2014 | Moore et al. |
| 2016/0162629 A1 | 6/2016 | Verbrugge et al. |
| 2016/0312765 A1* | 10/2016 | Boschitsch ............. F03D 3/005 |
| 2017/0218772 A1 | 8/2017 | Sharrow |
| 2017/0267323 A1 | 9/2017 | Sharrow |
| 2018/0186439 A1 | 7/2018 | Sharrow |
| 2018/0237122 A1 | 8/2018 | Sharrow |
| 2018/0293339 A1* | 10/2018 | Corey ..................... G06F 30/20 |
| 2019/0179997 A1 | 6/2019 | Colas et al. |
| 2020/0331602 A1* | 10/2020 | Mikic ................... B64C 11/303 |

OTHER PUBLICATIONS

R. MacNeill, D. Verstraete, "Propeller Optimisation for an Electrically-Power Tactical UAS", pp. 1-15, (Year: 2018).*
B. G. Marinus, M. Roger, R.A. Van Den Braembussche "Aeroacoustic and Aerodynamic Optimization Aircraft Propeller Blades", pp. 1-17, (Year: 2010).*
D'Epagnier, K. "A Computational Tool for the Rapid Design and Prototyping of Propellers for Underwater Vehicles." In: Department of Mechanical Engineering on Aug. 24, 2007, [online] [retrieved on Mar. 15, 2021 (Mar. 15, 2021)] Retrieved from the Internet < URL: https://dspace.mit.edu/handle/1721.1/42314>.
International Search Report and Written Opinion for International Application No. PCT/US20/47811, dated Apr. 6, 2021 (12 pages).
MacNeill, et al. "Propeller Optimisation for an Electrically-Powered Tactical UAS." In: 31st Congress of the International Council of the Aeronautical Sciences, Sep. 2018 [online] [retrieved on Mar. 15, 2021 (Mar. 15, 2021)] Retrieved from the Internet < URL: https://www.semanticscholar.org/paper/PROPELLER-OPTIMISATION-FOR-AN-ELECTRICALLY-POWERED-MacNeill-Verstraete/bdd72ccd9c7cd49c7dad53c73fl0bc73834d2aa9>.
Marinus, et al. "Aeroacoustic and Aerodynamic Optimization of Aircraft Propeller Blades." In: 16th AIAA/CEAS Aeroacoustics Conference, Jun. 2010, Stockholm, [online] [retrieved on Mar. 15, 2021 (Mar. 15, 2021)] Retrieved from the Internet < URL: https://www.researchgate.net/publication/260622751>.

* cited by examiner

PROPELLER DESIGN SYSTEMS AND METHODS

CROSS-REFERENCE TO RELATED APPLICATIONS

This application claims priority from U.S. Provisional Application Ser. No. 62/891,462 entitled "Propeller Design Systems and Methods," which was filed Aug. 26, 2019, and which is incorporated by reference herein in its entirety.

GOVERNMENT RIGHTS

This invention was made with Government support under Grant No. FA8702-15-D-0001 awarded by the U.S. Air Force. The Government has certain rights in the invention.

FIELD

The present disclosure relates to systems and methods for designing propellers and propeller blades using multidisciplinary optimization techniques.

BACKGROUND

Multidisciplinary design optimization (MDO) is an emerging field of engineering that encompasses using optimization methods to solve design problems involving more than one discipline. Existing MDO techniques involve considering the interactions between the multiple disciplines during a design optimization process, where the resultant design achieved using an MDO approach is typically better than alternative designs that result from optimizing each discipline in sequence. MDO methods have been employed in a variety of applications, but the complex and multidisciplinary nature of aircraft makes MDO methods particularly useful. One example aerospace application of the MDO techniques involves combining optimization with aerodynamic and structural methods (i.e., aerostructural) because of the strong physical interaction between these two aerospace design parameters.

Traditionally, multidisciplinary optimization problems have been solved using an approach of sequential disciplinary optimization (e.g., optimize for discipline A, then take that result and optimize for discipline B, then do the same for discipline C, then repeat—analogous to Gauss-Seidel fixed-point iteration). However, recent work in the MDO field has shown that this approach is prone to solution stalling, and it is very inefficient because it takes the normally-isotropic design space and forces an artificial parameterization for design improvement at each iteration. Another example multidisciplinary problem is propeller design, which is especially complicated when the acoustic signature of the propeller is a design quantity of interest. Current propeller design primarily relies on aerodynamic performance and does not typically account for integrated whole system design.

Accordingly, there is a need for improved systems and methods for designing propellers that can quickly and efficiently design propellers that are optimized across a variety of parameters.

SUMMARY

The present application is directed to systems and methods for designing propellers using multidisciplinary optimization (MDO) techniques that include optimization of the aeroacoustic performance of the propeller. Propeller design is a complex, multidisciplinary problem, and it becomes even more so when designing to minimize the acoustic signature due to the relationship between aerodynamic performance and acoustic signature. Certain aspects of the present disclosure include performing multiples simultaneous optimizations specifically to produce propeller blade geometries that present a balance between minimizing their acoustic noise signature while also maximizing other performance parameters based on a pre-defined weighting.

Embodiments include systems and methods that unify aerodynamic, electrical, structural, and acoustic analyses for unmanned aerial vehicle (UAV)-scale propellers in a single optimization routine. While some of the individual analyses used for each discipline might not have unique methodologies, the unification of all of these disciplines in a single optimization routine represents a new and powerful capability. Example of the present disclosure include a hybrid optimizing routine that functions as a single common framework capable of solving complex blade design optimization problems that were simply not possible before.

Aspects of the present disclosure achieve higher convergence rates and much more robust solutions than prior techniques by optimizing for multiple related disciplines (e.g., aerodynamic, aeroacoustic, structural, and electrical) at each iteration. Certain aspects include computational geometry tools to enable the rapid generation of CAD files of the designs being evaluated. Examples of the present disclosure enable a user to design a propeller blade geometry in a unified framework all the way from a list of design requirements to a final, optimized, manufacture-ready CAD model. Using embodiments of the present disclose, a single engineer at a desktop computer can design an optimized propeller from scratch in a single afternoon, or even more quickly. If rapid prototyping tools are used, the engineer can go from a set of requirements to a printed, flight-ready propeller model in less than 24 hours. This fast turnaround enables engineers to explore a much wider design space and validate many more designs than was previously possible.

Examples of the present disclosure provide for a new approach to a priori noise prediction at UAV scales. Embodiments can combine experimental correlations and analytical methods to predict noise for turbulence-dominated broadband noise generation. While there have been tools that facilitate the acoustic signature prediction of helicopter rotors and full-scale aircraft propellers (e.g., PSU-WO-PWOP, XROTOR, and ANOPP2), there has been relatively little work done to examine sources of propeller noise at typical UAV scales. The sources of noise at UAV scales are fundamentally different than those at larger scales (turbulence-dominated rather than compressibility-dominated), and, accordingly, existing optimized blade designs for larger rotors do not scale to smaller sizes. Aspects of the present disclosure can include a combination of experimental correlations (e.g., generated by NREL, originally for use on wind turbines) and analytical methods (e.g., using software tools such as XFOIL and QProp) to predict noise. The present disclosure describes novel methods and systems for use in designing and optimizing UAV propellers based on performance parameters, such as broadband noise.

Aspects of the present disclosure have many commercial applications in any space where rotors, fans, or propellers are currently used. For example, lower noise UAVs can benefit drone delivery companies, aerial photography, and personal use. There is also a potential market for urban air mobility, including urban air taxis. Moreover, aspects of the present disclosure are not limited to only air rotors. Propellers for use in water or other fluids can also benefit from this technology. Although the present disclosures are primarily targeted towards UAV scale uses, the teachings provided for herein can be used on larger scales, such as large rotorcrafts by way of non-limiting example. Additionally, although examples provided in the present disclosure generally use rotating airfoils, a person skilled in the art, in view of the present disclosures, understands the present disclosures can also be applied at least for use with fixed air foils, hydro foils, and/or in automotive design.

One exemplary computer-implemented system for designing and optimizing a propeller blade includes an input, a blade generation module, a performance analysis module, and an operation module. The input is configured to receive one or more design parameters and an associated weighting for at least one parameter of the one or more design parameters. The blade generation module is configured to receive one or more structural parameters and generate, as an output, at least one candidate blade geometry based on the one or more structural parameters. The performance analysis module is configured to receive the at least one candidate blade geometry. It is also configured to calculate, as an output: (1) one or more aerodynamic parameters of one or more candidate blade geometries of the at least one candidate blade geometry; (2) one or more electric power parameters for driving a motor associated with a propeller having blades of the one or more candidate blade geometries of the at least one candidate blade geometry; and (3) one or more acoustic noise parameters of the propeller having blades of the one or more candidate blade geometries of the at least one candidate blade geometry. The optimization module is configured to interface with the blade generation module, the performance analysis module, and the input and compare the output of the performance analysis module to the one or more design parameters based on the associated weighing. The optimization module is also configured to adjust the one or more structural parameters and receive, from the blade generation module, one or more new candidate blade geometries. Further, the optimization module is configured to input the one or more new candidate blade geometries to the performance analysis module. The optimization module is configured to repeat the compare, adjust, and input actions until a minima of the one or more design parameters is found based on the associated weightings. Still further, the optimization module is configured such that after the minima is found, the optimization module outputs the one or more new candidate blade geometries as one or more optimized blade geometries. One or more of the one or more aerodynamic parameters, the one or more electric power parameters, and the one or more acoustic noise parameters include the one or more design parameters.

The blade generation module can be configured to interface with one or more databases that contain a plurality of airfoil shapes. The blade generation module can be configured to construct the one or more candidate blade geometries from one or more airfoil shapes from the database(s) based on the one or more structural parameters. In some such embodiments, the database(s) contain at least one structural performance parameter for each airfoil shape of the plurality of airfoil shapes, and the blade generation module can be configured to construct the candidate blade geometry(ies) from the airfoil shape(s) that satisfies a constraint on the at least one structural performance parameter of the respective airfoil shape of the plurality of airfoil shapes. The one or more design parameters can include a constraint on the at least one structural performance parameter. The at least one structural parameter can include a polar moment of inertia.

In some embodiments, the plurality of airfoil shapes in the database(s) can define a Pareto-optimal airfoil family based on the one or more structural performance parameters and one or more airfoil performance parameters.

The performance analysis module can include an aerodynamic analysis module, an electrical analysis module, and/or an aeroacoustic analysis module. The aerodynamic module can be configured to receive the at least one candidate blade geometry and calculate, as an output, the one or more aerodynamic parameters of one or more candidate blade geometries of the at least one candidate blade geometry. The electrical analysis module can be configured to receive the at least one candidate blade geometry and at least one of the aerodynamic parameter(s) and calculate, as an output, the one or more electric power parameters for driving a motor associated with a propeller having blades of the one or more candidate blade geometries of the at least one candidate blade geometry. The aeroacoustic analysis module can be configured to receive the at least one candidate blade geometry and at least one of the one or more aerodynamic parameters and calculate, as an output, the acoustic noise parameter(s) of the propeller having blades of the one or more candidate blade geometries of the at least once candidate blade geometry.

In some such embodiments, the aerodynamic analysis module can be configured to conduct a blade-element momentum theory analysis of the at least one candidate blade geometry. The aeroacoustic analysis module can be further configured to interface with one or more estimators that are configured to output at least one of a broadband noise estimate or a tonal noise estimate based on the at least one candidate blade geometry and the aerodynamic parameter(s). Still further, the aeroacoustic analysis module can be configured to calculate one or more farfield noise parameters of the propeller based on the broadband noise estimate and/or the tonal noise estimate. The electrical analysis module can be further configured to simulate a circuit model that includes a motor and a speed controller associated with the propeller and calculate the electrical power to drive the circuit model.

In at least some instances of the system, the input can be configured to receive operating conditions. In such embodiments, the performance analysis module can be configured to receive the operating conditions and calculate one or more of the aerodynamic parameter(s), the electric power parameter(s), and/or the acoustic noise parameter(s) at the operating conditions. The input can be configured to receive one or more constraints on the structural parameter(s), and the optimization module can be configured to adjust the structural parameter(s) based on the constraints. In some embodiments, the input can be configured to receive one or more constraints on at least one of the aerodynamic parameter(s), the electric power parameter(s), or the acoustic noise parameter(s). The performance analysis module can be configured to only output performance parameters at operational conditions where the one or more constraints are satisfied.

The aerodynamic parameter(s) can include at least one of thrust, torque, mechanical power, or rotations per minute. The one or more structural parameters can include at least one or more of airfoil shape, blade diameter, chord length, or twist angle.

The system can be such that the optimization module has a first mode and a second mode. In the first mode, the optimization module can be configured to generate a plurality of surrogate points by randomly sampling the structural parameter(s), with each surrogate point of the plurality of surrogate points representing a new candidate blade geometry of the one or more new candidate blade geometries. The optimization module can be further configured to generate a design space of the plurality of surrogate points by passing each new candidate blade geometry of the one or more new candidate blade geometries into the performance analysis module. The design space can include values of the one or more design parameters calculated for each new candidate blade geometry of the one or more new candidate blade geometries. The optimization module can still be further configured to determine one or more local minima of the design space based on the associated weightings of the one or more design parameters. In the second mode, the optimization module can determine a global minimum of the design space using a gradient-informed algorithm to generate new candidate geometries to pass into the performance analysis module. The optimization module can further populate the design space until the weighted values of the one or more design parameters converge at an optimized blade geometry. In some embodiments, the optimization module can use Latin Hypercube sampling in the first mode go generate the plurality of surrogate points.

Another exemplary computer-implemented system for designing and optimizing a propeller blade includes an input, a blade generation module, a performance analysis module, and an optimization module. The input is configured to receive one or more design parameters and an associated weighting for at least one parameters of the one or more design parameters. The blade generation module is configured to receive one or more structural parameters and generate, as an output, at least one candidate blade geometry based on the one or more structural parameters. The performance analysis module is configured to receive the at least one candidate blade geometry and calculate, as an output, one or more performance parameters of the at least one candidate blade geometry. The optimization module has a first mode and a second mode. In the first mode, the optimization module is configured to generate a plurality of surrogate points by randomly sampling the one or more structural parameters. Each surrogate point of the plurality of surrogate points represents a new candidate blade geometry. The optimization module is further configured to generate a design space of the plurality of surrogate points by passing each new candidate blade geometry into the performance analysis module. The design space includes values of the one or more design parameters calculated for each new candidate blade geometry. Still further, the optimization module determines one or more local minima of the design space based on the associated weightings of the one or more design parameters. In the second mode, the optimization module is configured to determine a global minimum of the design space using a gradient-informed algorithm to generate new candidate geometries to pass into the performance analysis module and further populate the design space until the weighted values of the one or more design parameters converge at an optimized blade geometry. The one or more performance parameters include the one or more design parameters.

In some embodiments, the design parameter(s) include at least one of one or more aerodynamic parameters, one or more electric power parameters, or one or more acoustic noise parameters. This exemplary computer-implemented system for designing and optimizing a propeller blade can include made, if not all, of the same features described as options for the first-described exemplary computer-implemented system for designing and optimizing a propeller blade.

Additionally, the present disclosure provides for one or more exemplary methods of optimizing a design of a propeller blade, such methods being derivable at least from the above-described systems and the systems and methods described below. One example includes receiving, via an input operated by a processor, each of: one or more design parameters and an associated weighting for at least one parameter of the one or more design parameters; and one or more structural parameters. The method further includes generating, via a blade generation routine operated by a processor, at least one candidate blade geometry based on the one or more structural parameters, and calculating, using a performance analysis routine operated by a processor, the following blade parameters: (1) one or more aerodynamic parameters of one or more candidate blade geometries of the at least one candidate blade geometry; (2) one or more electric power parameters for driving a motor associated with a propeller having blades of the one or more candidate blade geometries of the at least one candidate blade geometry; and (3) one or more acoustic noise parameters of the propeller having blades of the one or more candidate blade geometries of the at least one candidate blade geometry. The method also includes executing an optimization routine using the processor, the optimization routine including the steps of: (a) comparing the calculated blade parameters to the one or more received design parameters based on the associated weighting; (b) adjusting the one or more structural parameters and generating, via the blade generate routine, one or more new candidate blade geometries; (c) calculating, using the performance analysis routine, the blade parameters for each of the one or more new candidate blade geometries; (d) repeating steps (a), (b), and (c) until a minima of the one or more design parameters is found based on the associated weightings; and (e) after the minima is found, outputting the one or more new candidate blade geometries as one or more optimized blade geometries. One or more of the one or more aerodynamic parameters, the one or more electric power parameters, and the one or more acoustic noise parameters comprises the one or more design parameters. The processors used in the method as provided for in this paragraph or further below can be any combination of processors, including all being the same processor, all being different processors, or multiple processors, some of which perform one or more of the described actions and some of which perform one or more of the other described actions. This holds true throughout the present application.

The method can include interfacing, via the blade generation routine, with one or more databases containing a plurality of airfoil shapes, and constructing, via the blade generation routine, the one or more candidate blade geometries from one or more airfoil shapes from the one or more databases based on the one or more structural parameters. In some embodiments, the one or more databases contain at least one structural performance parameter for each airfoil shape of the plurality of airfoil shapes, and the action of constructing, via the blade generation routine, includes constructing the one or more candidate blade geometries from the plurality of airfoil shapes to satisfy a constraint on the at least one structural performance parameter of the respective airfoil shape of the plurality of airfoil shapes. The one or more design parameters can include a constraint on the at least one structural performance parameter. The at least one structural performance parameter can include a polar moment of inertia. In some embodiments, the plurality of airfoil shapes in the one or more databases can define a Pareto-optimal airfoil family based on the one or more structural performance parameters and one or more airfoil performance parameters.

The performance analysis routine can include receiving, via an aerodynamic analysis routine operated by a processor, the at least one candidate blade geometry and calculating, as an output, the one or more aerodynamic parameters of one or more candidate blade geometries of the at least one candidate blade geometry. The routine can also include receiving, via an electrical analysis routine operated by a processor, the at least one candidate blade geometry and at least one of the one or more aerodynamic parameters and calculating, as an output, the one or more electric power parameters for driving a motor associated with a propeller having blades of the one or more candidate blade geometries of the at least one candidate blade geometry. Still further, the routine can include receiving, via an aeroacoustic analysis routine operated by a processor, the at least one candidate blade geometry and at least one of the one or more aerodynamic parameters and calculating, as an output, the one or more acoustic noise parameters of the propeller having blades of the one or more candidate blade geometries of the at least one candidate blade geometry. In some embodiments, the method can include the aerodynamic analysis routine conducting a blade-element momentum theory analysis of the at least one candidate blade geometry.

The method can include interfacing, via the aeroacoustic analysis routine, with one or more estimator routines operated by a processor to output at least one of a broadband noise estimate or a tonal noise estimate based on the at least one candidate blade geometry and the one or more aerodynamic parameters, and calculating, via the aeroacoustic analysis routine, one or more farfield noise parameters of the propeller based on at least one of the broadband noise estimate or the tonal noise estimate. In some embodiments, the method can include simulating, via the electrical analysis routine, a circuit model comprising a motor and a speed controller associated with the propeller and calculating the electrical power to drive the circuit model.

In some embodiments, the method can include receiving, via the input, operating conditions, and receiving, via the performance analysis routine, the operating conditions. In such instances, one or more of the one or more aerodynamic parameters, the one or more electric power parameters, or the one or more acoustic noise parameters can be calculated at the operating conditions. Additionally, or alternatively, the method can include receiving, via the input, one or more constraints on the one or more structural parameters, and adjusting, via the optimization routine, the one or more structural parameters based on the constraints.

In some embodiments, the method can include receiving, via the input, one or more constraints on at least one of the one or more aerodynamic parameters, the one or more electric power parameters, or the one or more acoustic noise parameters. In such embodiments, the performance analysis routine may only output performance parameters at operational conditions where the one or more constraints are satisfied.

The one or more aerodynamic parameters can include at least one of: thrust, torque, mechanical power, or rotations per minute. The one or more structural parameters can include at least one or more of: airfoil shape, blade diameter, chord length, or twist angle.

The optimization routine can have a first mode and a second mode. In the first mode, the optimization routine can: (1) generate a plurality of surrogate points by randomly sampling the one or more structural parameters, with each surrogate point of the plurality of surrogate points representing a new candidate blade geometry of the one or more new candidate blade geometries; (2) generate a design space of the plurality of surrogate points by passing each new candidate blade geometry of the one or more new candidate blade geometries into the performance analysis routine, with the design space including values of the one or more design parameters calculated for each new candidate blade geometry of the one or more new candidate blade geometries; and (3) determine one or more local minima of the design space based on the associated weightings of the one or more design parameters. In the second mode, the optimization routine can determine a global minimum of the design space, for example, using a gradient-informed algorithm to generate new candidate geometries to pass into the performance analysis routine and further populate the design space until the weighted values of the one or more design parameters converge at an optimized blade geometry. In some embodiments, the optimization routine in the first mode can generate a plurality of surrogate points using, for example, Latin Hypercube sampling.

BRIEF DESCRIPTION OF DRAWINGS

This disclosure will be more fully understood from the following detailed description taken in conjunction with the accompanying drawings, in which.

DETAILED DESCRIPTION

Figure 1A:
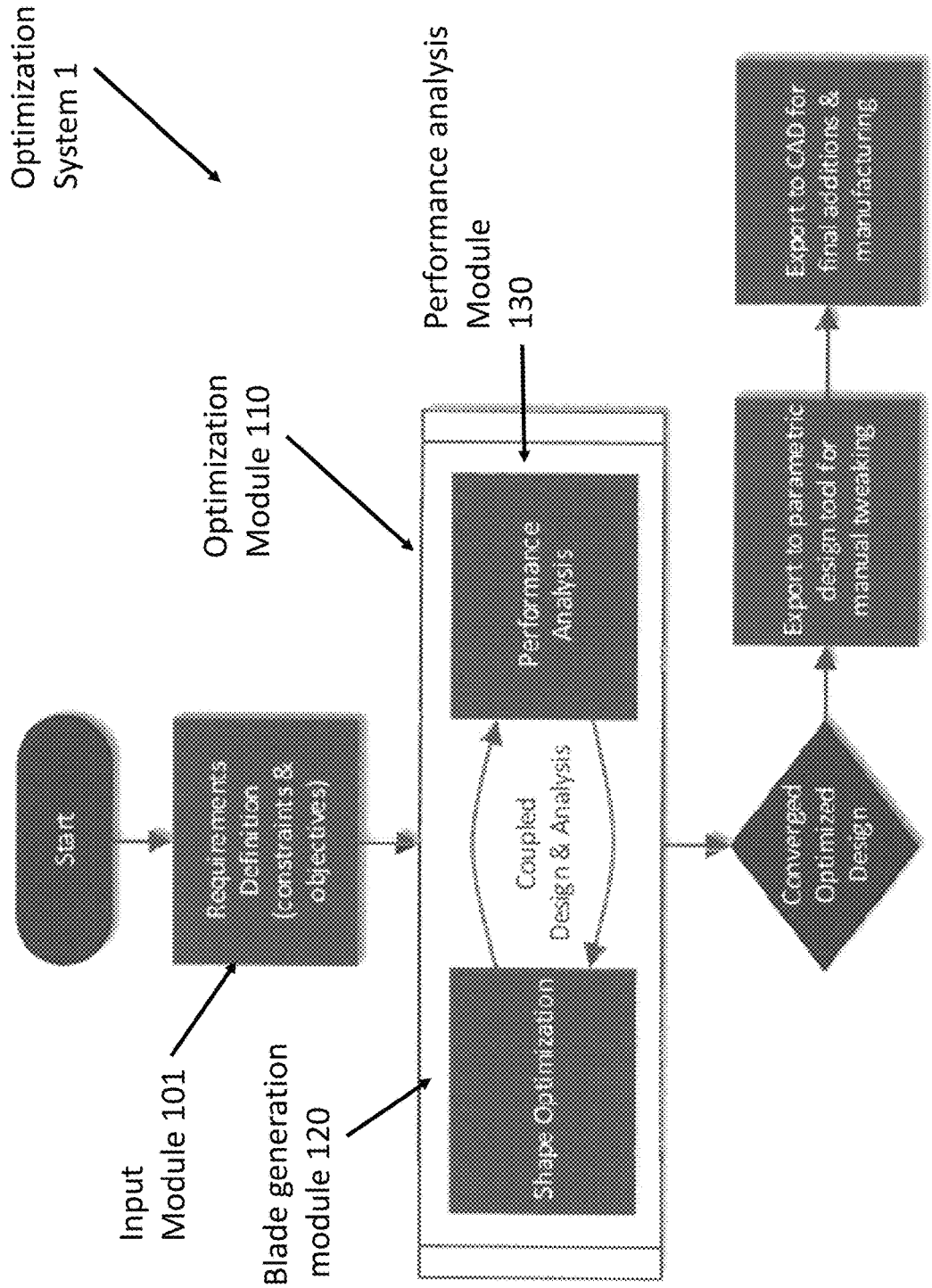
FIG. 1A provides a flowchart illustration of one exemplary embodiment of actions that can be performed in conjunction with creating an optimized propeller design.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments.

Such modifications and variations are intended to be included within the scope of the present disclosure.

Propeller design is a complex, multidisciplinary problem. The addition of acoustic signature as quantity of interest only adds to the difficulty of design problem. The present disclosure provides system and methods for designing a propeller or a propeller blade geometry using multiple simultaneous optimizations to produce a blade geometry that is optimized with respect to a combination of aerodynamic, structural, aeroacoustic, and/or electrical characteristics, as weighted by the user. The present disclosure represents a novel combination and application of aerodynamic, structural, aeroacoustic, and electrical analysis algorithms specifically for the design of propellers where acoustic noise is a design parameter, which certain embodiment achieve through the unification of multiple design criteria in a single global optimization routine.

Existing blade analysis methods typically involve a forward design and analysis process, whereby a given blade or propeller structure is analyzed for quantities of interest, however, aspects of the present disclosure represent a reverse approach: where a resultant structure that has a reduced-noise geometry is determined based on one or more optimization routines using user-specified characteristics. Moreover, certain aspects of the present disclosure include a hybrid global optimization routine (e.g., an optimization module of a computer or a computer-implemented software) that greatly enhances both the speed and robustness of the resultant propeller blade solutions compared to existing methods for aeroacoustic optimization.

Prior art methods for analyzing the acoustic signature or propellers and propeller blade for the purposes of noise prediction has been primarily directed towards helicopters and involved the study of broadband noise sources and the coupling boundary layer turbulence properties into wake noise. Such methods are not optimized in a manner that can provide for quieter propellers. The present disclosures, on the other hand, can allow for the optimization of blade geometry, at least in instances in which the aerodynamics of the propellers are not fixed or tightly constrained. In some instances, the optimizations are permitted to drive the solution away from 'optimum' aerodynamics if another design parameter, such as acoustic noise signature or electric power demand, would improve more than the corresponding reduction in aerodynamic performance (e.g., based on a weighting).

Accordingly, aspects of the present disclosure include an optimization routine that enables a user to select one or more design parameters and assign associated weightings for each parameter. The optimization routine can then iterate, as described below, the design of a propeller blade geometry in view of multiple different structural and performance analyses until a blade design is found whose design parameters (as calculated by various structural and performance analyses) is a minima (or maxima, as the terms can be used interchangeably herein) of the chosen design parameters according to their weightings. For example, a user may specify that a blade design should be optimized based on the overall noise (e.g., sound pressure level in dB [SPL]), thrust (e.g., force in kg), and electrical power required (e.g., watts), with corresponding weightings of 75%, 15%, and 10%. Accordingly, the optimization routine can find a blade geometry that is not necessarily the quietest possible design for a given set of constraints, but instead of a hybrid optimization of a quiet design that could have more thrust and lower electric power requirements compared to a hypothetical quietest possible design. Such a solution represents a minima of the design space that includes noise, thrust, and electric power (e.g., the input design parameters) based on the associated weightings. Moreover, such a result is not predetermined, as the optimization routines here enable the exploration of design spaces that may have never been considered before, and various weightings may result in blade designs having novel performance envelopes.

In other instances, the user may input constraints, such as max RPM, minimum thrust, and/or a range of allowed blade lengths for example, and the optimization routine might only consider minima in the resultant design space where these constraints are satisfied. In other instances, the optimization routine can adjust the iteration of blade geometry solutions during the optimization away from solutions that violate constraints or, alternatively, only conduct the performance analyses across ranges that satisfy the constraints (e.g., calculating thrust only up to a given max RPM)

FIG. 1A shows a flowchart illustration of one exemplary embodiment of actions that can be performed in conjunction with creating an optimized propeller design. The actions can be the steps of a procedure or method performed, or they can be representative of actions performed by a system, or modules of a system. As shown, an optimization system 1 can include a starting or inputting routine (e.g., an input or an input module 101 of a computer system) to receive the design parameters, including, for example, constraints and objectives to be considered during the optimization. Next, the system can include a coupled, or iterative, optimization routine (e.g., an optimization module 110 of a computer system) that conducts performance analysis on a given blade geometry (e.g., by a performance analysis module 130 of a computer system) and, based on the design parameters, iteratively optimizes the shape of the blade geometry (e.g., using a blade generation module 120 of a computer system) based on the weighted results of the design parameters returned by the performance analysis.

As a basic illustrative example of such an iterative optimization routine, starting with a blade geometry of X1, and design parameters of A and B, the performance analysis returns values a1 and b1 of A and B for X1, and generates an X2 blade geometry, which then returns values of a2 and b2, and X3 with a3 and b3, etc., where each blade geometry forms a point in a design space Xi, with the values ai and bi. The values ai and bi of the design space can be weighted by associated weighting received along with the initial design parameters of A and B. The system can include an optimization routine that populates the weighted design space Xi to find a particular blade geometry that most-closely corresponds to a local or global minima of the weighted ai and bi. In one example, the optimization routine first populates the design space by generating new blade geometries using a random sample routine, within any design constraints (if provided), then analyzes the resultant weighted design space to locate any minima, and then further explores the design space around the minima with a gradient-aware algorithm that attempts to converge each subsequently generated blade geometry towards a global minima of the design space.

By way of non-limiting example of the above generalized description, a user may input two design parameters, thrust and overall farfield noise at 45 degrees, along with an associated weighting for each of the design parameters, for example, 70% for thrust and 30% for the farfield noise. The user can also input additional design constraints, such as a max RPM of 2000 and a max blade diameter of 20 cm (or, similarly, a max blade length of about 8 cm to account for a standard propeller hub). In operation, the optimization system can first call the blade generation routine to create a 3D blade geometry based, at least in part, on, depending on the optimization mode, either a random sampling of structural parameters (e.g., airfoil size, twist, chord length) that satisfies the blade length constraint or any other input constraints. In this manner, referred to herein as a "first mode," the optimization routine generates a design space of various candidate blade geometries (e.g., 10 to 100 or more) based on the random sampling of structural parameters that satisfy the constraints inputted by the user. For each candidate blade geometry in the design space, the optimization routine calls a performance analysis routine to calculate various performance parameters for each blade geometry, which can include values for the design parameters chosen to be optimized (e.g., thrust and farfield noise). The optimization routine then populates the design space with the weighted values for these design parameters. Next, in a gradient-aware mode, referred to herein as a "second mode," the optimization routine explores the detected minima of the designs space (e.g., blade geometries having a favorable weighted thrust and farfield noise) by generating new structural parameters near the previously-calculated geometries to determine, for example, the direction or vector of the values in the design space with respect to the structural parameters of the blade geometries there. Further, the optimization routine can calculate additional performance parameters for these new blade geometries and further populate the design space to explore any local minima and converge the structural parameters of the blade geometries towards a global minimum of the weighted design parameters.

Continuing with respect to FIG. 1A, the example system can output the resultant optimized (e.g., converged solution) blade geometry to external design tools for subsequent design, such as integrating the blade geometry into a propeller design, generating design schematics, and/or CAD files for further design integration or manufacturing.

In some instances, the optimization system can include individual structural and performance analysis routines (e.g., implemented by a performance analysis module of a computer system) to determine the resultant design parameters of a given candidate blade geometry in order to, for example, have a reduced or optimized set of airfoil shapes for use in constructing the various blade geometries during the optimization routines discussed herein. For example, the system can include a structural analysis routine, which can, in some instances, calculate structural parameters of each airfoil shape used to construct the candidate blade geometry for a normalized set of material properties (e.g., material independent).

The system can be configured to receive an initial candidate blade geometry from the user for the system to iterate upon and optimize based on the provided design parameters, weightings, and constraints (if provided). In some instances, the system can include a blade generation routine (e.g., XFOIL, or a blade generation module of a computer system) that creates an initial blade geometry based on the design parameters, weightings, constraints, and operating conditions provided by the user or otherwise inputted into the system. In some instances, the blade generation routine can include a database of blade geometries that can be chosen based on their predetermined performance characteristics as compared to the received design parameters.

In some examples, the blade generation module receives a set of structural parameters (e.g., airfoil shape, cord length, twist, diameters) as an input and created a 3D blade geometry as an output. In some examples, one or more structural performance parameters are included in the user's design parameters and can be used as a constraint that the propeller blade geometry needs to be strong enough and have enough stiffness. For example, to ensure the entire cross section of the blade geometry is at uniform stress, to satisfy a "no structure is wasted" design requirement. One example structural parameter of interest is the polar moment of inertia. In operation, the blade generation module can use the structural performance parameters to generate candidate blade geometries only from airfoil shapes that satisfy the structural performance parameters. As propellers are not typically designed specifically for this structural parameter at smaller scales, aspects of the present disclosure can generate a custom family that have a desired structural integrity (e.g., uniform stress) at smaller length scales (e.g., for use in drones and other UAVs). Further, although rotating airfoils are provided for herein, a person skilled in the art, in view of the present disclosures, can apply the systems and methods of the present disclosure at least for use with fixed air foils, hydro foils, and/or in automotive design.

Figure 1B:
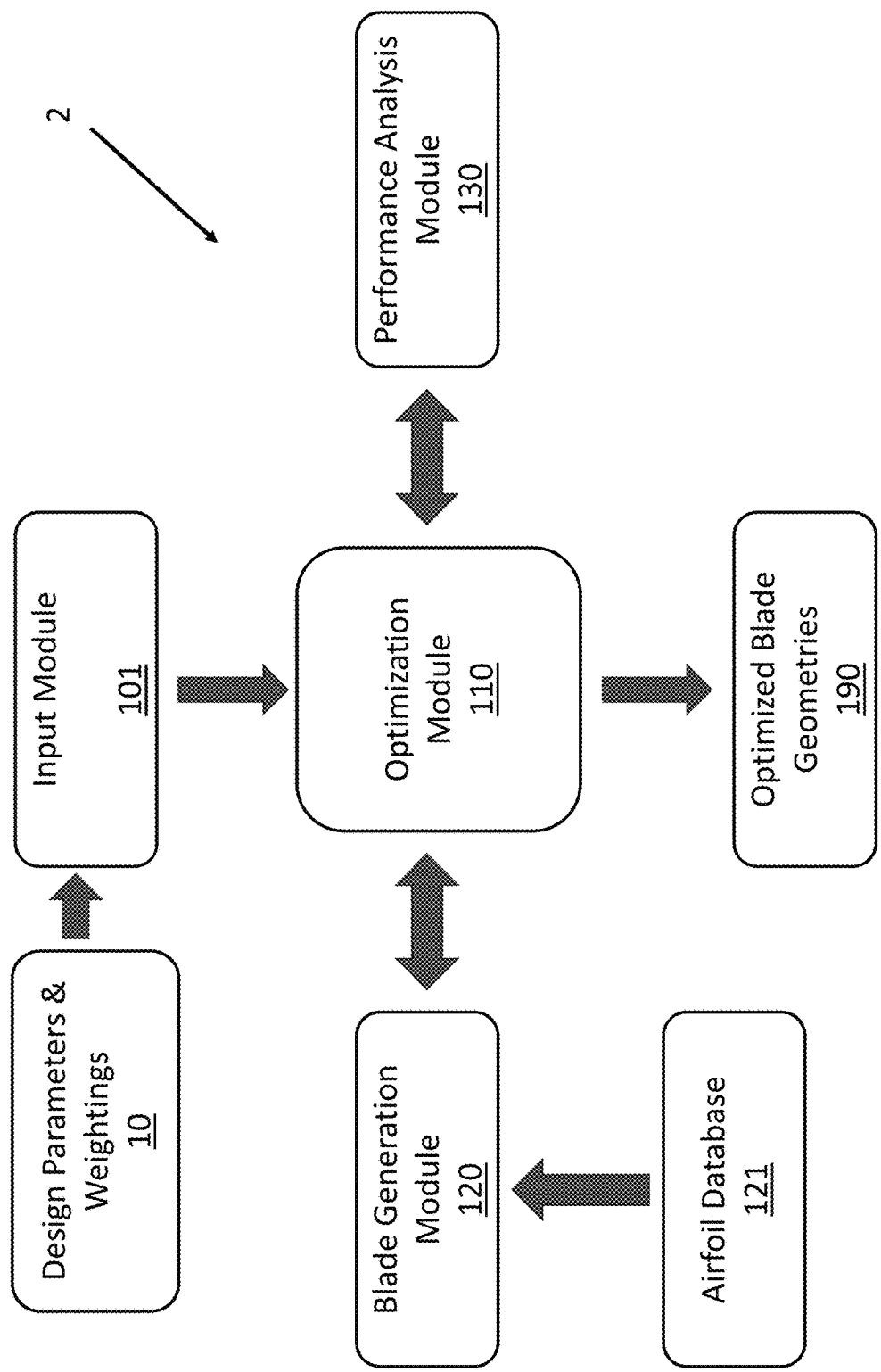
FIG. 1B is a schematic illustration of one exemplary embodiment of a propeller design system.

FIG. 1B is a schematic illustration of one exemplary embodiment of a computer-implemented system 2 of the propeller design optimization system 1. The system 2 includes an input module 101, an optimization module 110, a blade generation module 120, an airfoil database 121, and a performance analysis module 130. The optimization module 110 is configured to interface with the input module 101 to receive one or more design parameters 10 and any associated weightings of the parameters to be considered. Alternatively, the design parameters and/or weights can be inputted directly into the optimization module 110, or by other manners known to those skilled in the art. The optimization module 110 interfaces with the blade generation module 120 and the performance analysis module 130 to iteratively optimize candidate blade geometries received from the blade generation module 120 until one or more optimized blade geometries 190 are returned. The optimized blade geometries 190 are determined by the optimization module 190 factoring in various parameters from one or more of the input module 110, the design parameters 10 and associated weightings as desired, the performance analysis module 130, the blade generation module 120, and/or the airfoil database 121. Further details about at least the blade generation module 120 and the performance analysis module 130 are described below.

Figure 2:
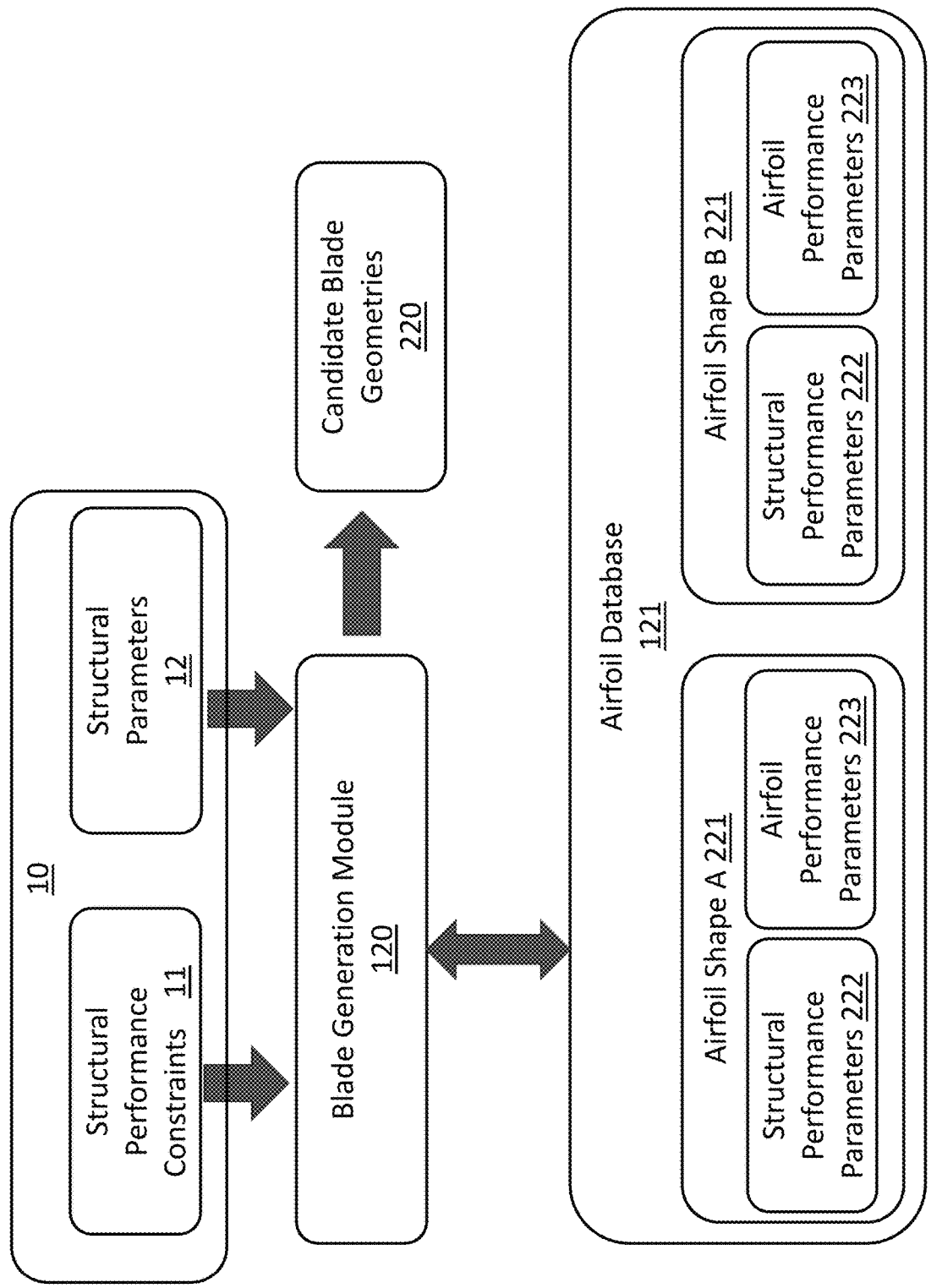
FIG. 2 is schematic illustration of one exemplary embodiment of a blade generation module of a propeller design system.

FIG. 2 shows a configuration of an example blade generation module 120 in more detail. The blade generation module 120 is configured to receive, via the input module 101 and/or the optimization module 110, certain design parameters, such as an initial structural parameters 12 and structural performance constraints 11. The blade generation module 120 interfaces with the airfoil database 121, which contains a plurality of different airfoil shapes 221 and associated structural performance parameters 222. More particularly, as illustrated, each airfoil shape in the airfoil database 121, illustrated as Airfoil Shape A 221 and Airfoil Shape B 221, can include structural performance parameters 222 and airfoil performance parameters 223. The blade generation module 120 generates candidate blade geometries 220 as an output based on the received structural parameters 12 and airfoil shapes 221 such that the resultant candidate blade geometries 220 satisfy any received structural performance constraints 11. Any number of airfoil shapes, and associated parameters, can be included as part of the airfoil database 121, and the database can be populated based on known airfoil shapes and/or airfoil shapes generated in conjunction with the present disclosures. The candidate blade geometries 220 can then be provided to the optimization module 110 for analysis based, at least in part, on the design parameters 10 and associated weightings, other parameters associated with the input module 101, and/or information from the performance analysis module 130 as the optimization module 110 iterates to generate the optimized blade geometries. For example, one or more of the candidate blade geometries can be analyzed using the performance analysis module 130, with such results being used to optimize and eventually generate the optimized blade geometries 190.

Figure 3:
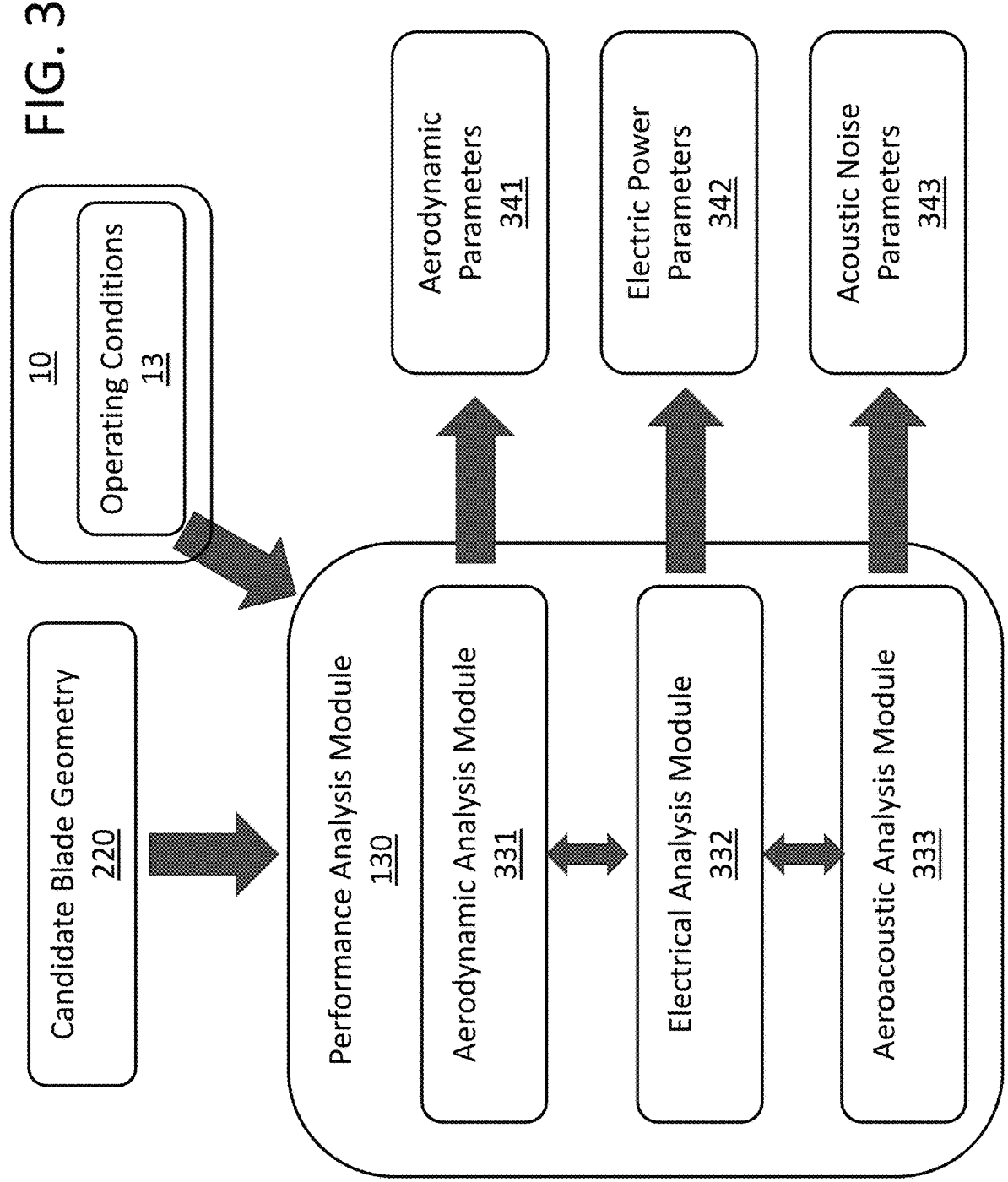
FIG. 3 is schematic illustration of one exemplary embodiment of a performance analysis module of a propeller design system.

FIG. 3 shows a configuration of an example performance analysis module 130 in more detail. The performance analysis module 130 can include a plurality of individual modules (or, alternatively or additionally, can be configured to interface with existing and/or external modules, systems, or databases), such as an aerodynamic analysis module 331, an electrical analysis module 332, and/or an aeroacoustic analysis module 333. The performance analysis module 130 can be configured to receive one or more candidate blade geometries 220 from the blade generation module 120 and/or the optimization module 110 (or directly from a user), as well as design parameters 10 from the input module 101 and/or the optimization module 100, including any operating conditions 13 to be considered (e.g., a desired altitude, air pressure, humidity, minimum thrust or lift, etc.). The aerodynamic analysis module 331 can be configured to generate one or more aerodynamic performance parameters 341 based on the received candidate blade geometry 220 and the operating conditions 13, as well as the generated electric power parameters 342 and/or the generated acoustic noise parameters 343. The electrical analysis module 332, likewise, can be configured to generate one or more electric power parameters 342 based on the candidate blade geometry 220 and the operating conditions 13, as well as the generated aerodynamic performance parameters 341 and/or the generated acoustic noise parameters. Still further, the aeroacoustic analysis module 333 can be configured to generate one or more acoustic noise parameters 343 based on the candidate blade geometry 220 and the operating conditions 13, as well the generated aerodynamic performance parameters 341 and/or the generated electric power parameters 342. The generated parameters 341, 342, and/or 343 can then be used by tope optimization module 110 as it iterates to determine the optimized blade geometries 190, as shown in FIG. 1B.

Figure 4:
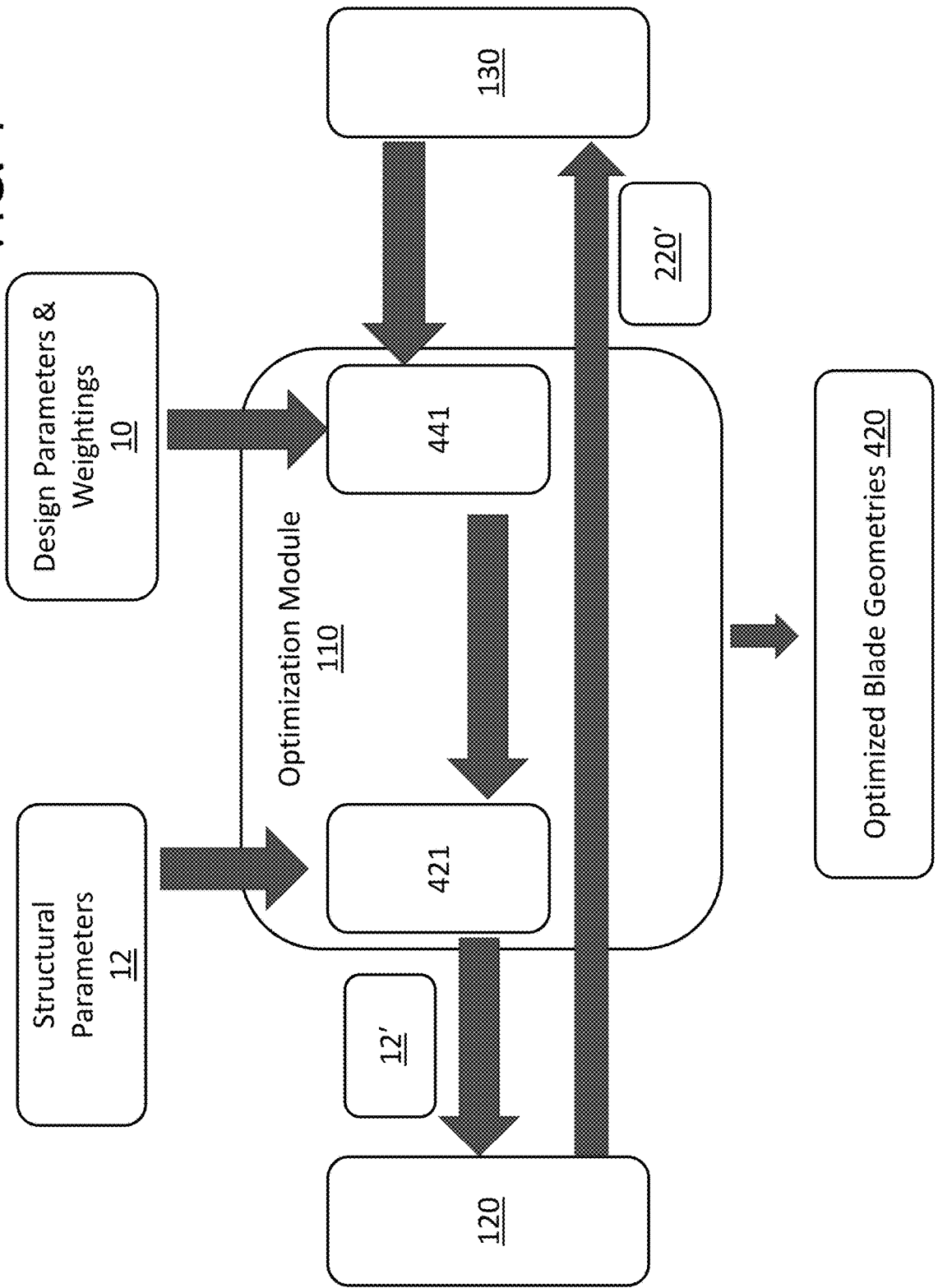
FIG. 4 is schematic illustration of one exemplary embodiment of an optimization module of a propeller design system.

FIG. 4 shows a configuration of an example optimization module 110 in more detail. The optimization module 110 can include a plurality of individual modules and routines, such as a comparison module 441 and an iterative adjustment module 421. The optimization module 110 can be configured to interface with the input module 101, among other modules described herein or otherwise known to those skilled in the art, to receive the design parameters 10 and any associated weightings. The optimization module 110 can also be configured to interface with the performance analysis module 130 and the blade generation module 120. For example, the comparison module 441 can receive the design parameters 10 and associated weightings, as well as the calculated performance parameters 341, 342, 343 from the performance analysis module 130, to determine how well each candidate blade geometry 220 produced by the blade generation module 120 satisfies the design parameters 10 and associated weightings. The iterative adjustment module 421 receives this result from the comparison module 441, as well as the structural parameters 12 associated with the candidate blade geometries 220, and generates adjusted structural parameters 12' that are provided to the blade generation module 120 to generate a new candidate blade geometry 220', which is subsequently provided to the performance analysis module 130. The performance analysis module 130 calculates new performance parameters and the optimization module 110 can iterate this process in a number of ways, as described herein, until one or more optimized blade geometries 420 are generated as an output.

Figure 5:
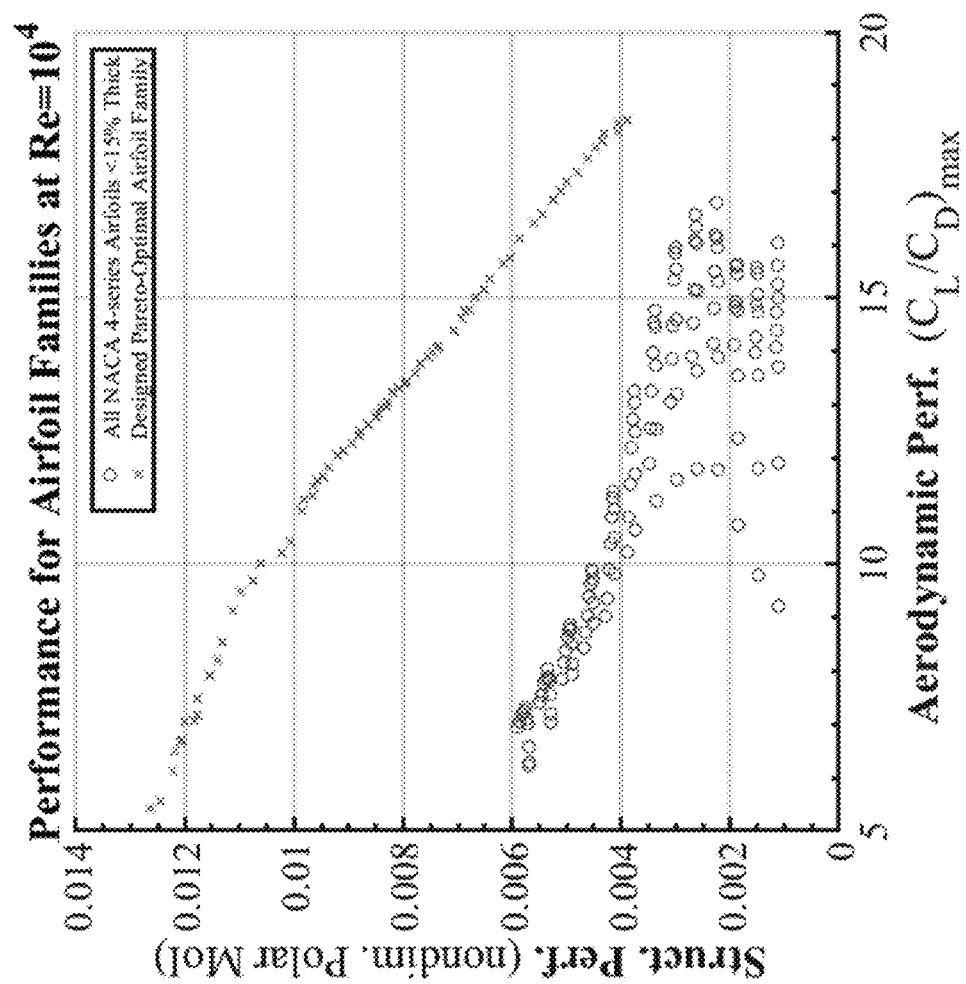
FIG. 5 is graph of one example set of airfoil shapes that satisfy a Praeto front solved for a structural performance parameter with respect to a performance parameter, which can be used by the optimization routines of the present disclosure.

FIG. 5 is an example of a set of airfoil shapes that satisfy a Pareto front solved for a structural performance parameter (as shown, polar moment of inertia) with respect to an airfoil performance parameter (as shown, the aerodynamic performance parameter of lift over max drag). In some instances, the system 2 includes a database 121 of airfoil shapes for use in generating the candidate blade geometry 220, and the shapes 221 in the database 121 can be a set of shape defining a Pareto front for a particular relationship, which can, in some instances, be provided by the use as an input for use in creating such a database for use in the optimization routines described herein.

Examples of the performance analysis routines used by optimization system 1 in accordance with the present disclosure include calculations for aerodynamic, aeroacoustic, and electrical performance parameters 341, 342, 343. Examples of aerodynamic performance parameters include thrust, torque, mechanical power, and RPM. Examples of aeroacoustic parameters include sound pressure level (SPL) spectrum, overall sound pressure level (OASPL), perceived noise level (PNL), and effective perceived noise level (EPNL). In some instances, the aeroacoustic parameters 341 include periodic noise and/or broadband noise. Examples of electrical performance parameters 342 include power and current draw.

In some instances, the system 2 can include an aerodynamic analysis routine (e.g., an aerodynamic analysis module 130 of a computer system), which can calculate the aerodynamic parameters 341 of each candidate blade geometry 220 for at a given operating condition 13 or across a range of possible operating conditions. In some examples, an aerodynamic performance routine receives a particular blade geometry 220 as an input and calculates one or more aerodynamic parameters 341 as an output. In some example, the aerodynamic routine includes interfacing with external resources, such as an existing blade-element momentum theory code (e.g., QPROP) to calculate one or more of the aerodynamic parameters for the candidate blade geometry 220. In some instances, the aerodynamic performance routine calculates the aerodynamic parameters 341 for the blade in 2D and extrapolates the performance of a 3D blade. In other instances, the aerodynamic routine calculates the aerodynamic performance parameters 341 for the blade in 3D.

In some instances, the system can include an aeroacoustic analysis routine (e.g., an aeroacoustic analysis module 332 of a computer system), which can, calculate the aeroacoustic parameters 342 of the candidate blade geometry 220 at a given operating condition 13 or across a range of possible operating conditions. In some instances, the aeroacoustic analysis routine simulates a propeller having one or more blades of the candidate blade geometry 220 and calculates the aeroacoustic parameters for the simulated propeller. For example, a user can input that a propeller will have three blades, and the aeroacoustic analysis routine can simulate the overall farfield noise spectrum of the three-bladed propeller having candidate blade geometries 220 at one or more reference observing angles. In some instances, the aeroacoustic analysis routine can interface with external resources to determine the different aspects of the noise production to calculate the resultant farfield spectrum. For example, the aeroacoustic analysis routine can interface with a noise estimator (e.g., a broadband noise estimation routine like NAFNoise) to estimate broadband or periodic noise for a given candidate blade geometry. In some instances, the aeroacoustic analysis routine can use external or internal routes to calculate a noise estimate based on existing propeller studies.

In some instances, the system can also include an electrical analysis routine (e.g., an electrical analysis module 333 of a computer system), which can, calculate the overall electrical power required to operate a simulated propeller having the candidate blade geometry 220 and powered by one or more components, such as an electric motor and speed controller. In some instances, the electrical analysis routine uses or determines properties of the motor to predict electrical efficiency at given operating condition (e.g., speed and torque) for the given candidate blade geometry 220 based on the aerodynamic performance parameters 341. In some instances, the electrical analysis routine calculates the electric power parameters 342 based on using brushless DC electric motors, which are a common type of motor for UAV applications.

The system can include a hybrid optimization routine that uses two or more optimization modes to determine the optimal blade geometry. For example, in a first mode, the hybrid optimization routine can use a gradient free optimization method to solve a surrogate that is very robust. This can be done, for example, by using Latin Hypercube sampling (e.g., random sampling in the multidimensional design space). In operation, the performance parameters 341, 342, 343 of the candidate blade geometry 220 can be solved at each of these surrogate points and a design space can be reconstructed around the results. The results can be further refined. This first mode can be used to explore the design space defined by the weighted design parameters 10 and any constraints and operating conditions 13 to find or generally locate any possible local minima. In some instances, in the first mode, the hybrid optimization routine can map the design space and get a basic understanding of it, such as gradients of design parameters between the surrogate points. Once the design space is populated enough to determine the possible location of any minima, the hybrid optimization routine can then switch over to a second mode, in which a faster gradient-based optimization can locate the minima and converge the solution at a global minima. In the second mode, a gradient-based optimization routine can use the results of the gradient-free optimization (e.g., the Latin Hypercube sampling) to use a gradient-informed algorithm to find global minima. In some instances, the hybrid optimization routine can enforce constraints (e.g., RPM max, min, or range) that are based on existing commercial platforms.

In some examples, a particular algorithm will "reset" after it has reached a minimum is reached, and the optimization routine will again randomly sample the design space before using a gradient driven approach to converge on a minimum. In operation, the optimization routine can, once the surrogate algorithm finds a minimum using the gradient based approach (e.g., the second mode), the system can cycle back to the first mode to see if it can improve the result of the gradient-based approach by adding more randomly sampled points in the design space and re-running the gradient-based search for new minima. This is done to attempt to find the global minimum, in case the first minimum was just a local minimum. In this way, the system does not necessarily assume that any minima that have been found are the global minima of the design space and the system can continue searching for a global minimum until the user stops it and/or some other condition for convergence is satisfied.

In some instances, the system includes one or more optimization algorithms, which can be selected by a user before conducting an optimization step. Accordingly, the system does not always use the coupled algorithm approach described above and can use, for example, a gradient based approach directly. Choosing the algorithm(s) utilized by the systems and methods is a user-based design choice afforded by the present disclosures, just as other aspects of the disclosed systems and methods can be user-selected and/or adjusted.

Figure 6:
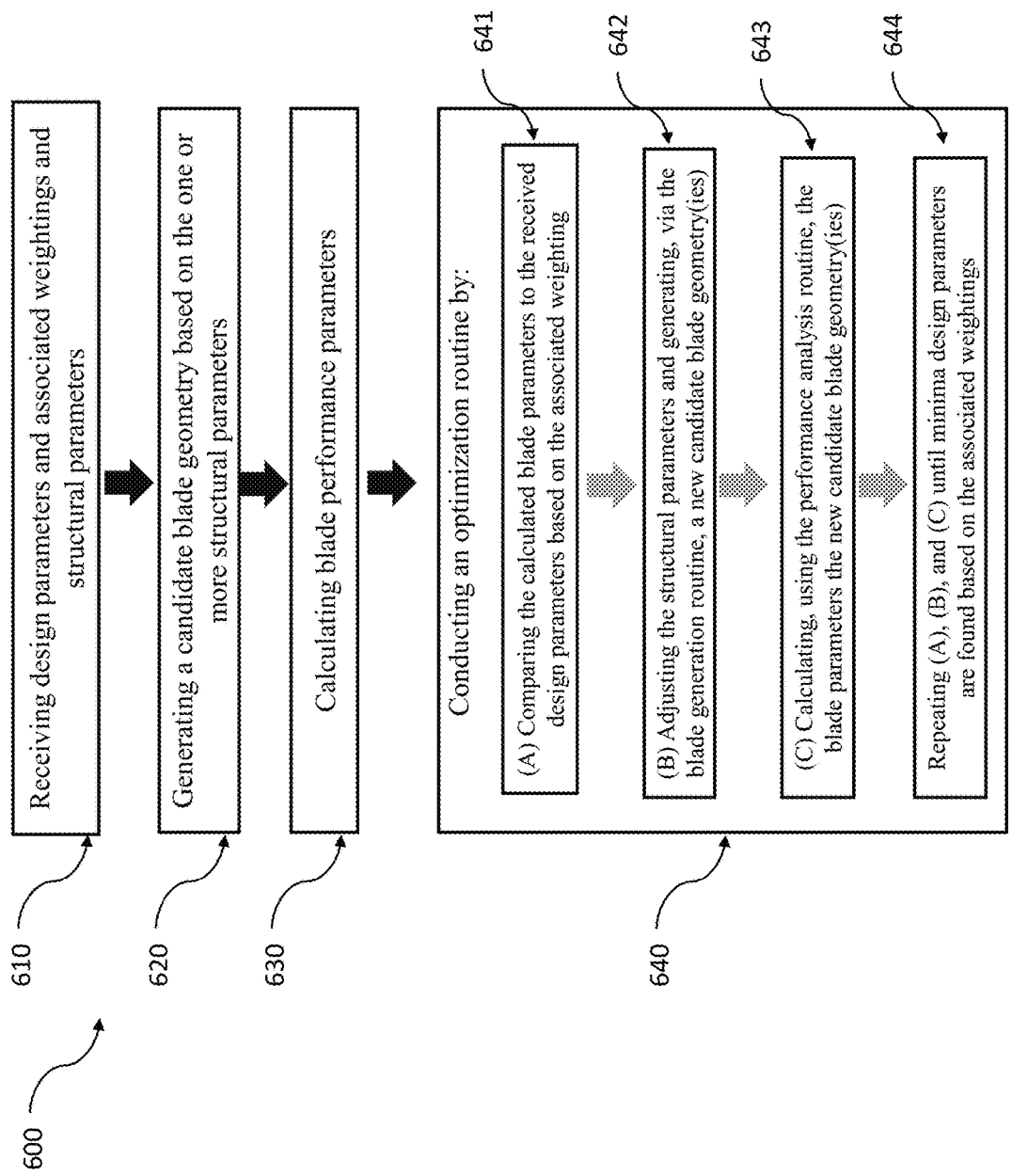
FIG. 6 is a flowchart illustration of one exemplary embodiment of a method of propeller design optimization.

FIG. 6 is a flowchart illustration of one exemplary embodiment of a method of propeller design optimization. The flowchart 600 is easily understood in view of the present disclosure, illustrating various steps or actions that can be performed in designing and optimizing one or more propeller blades. These steps include: a step 610 that includes receiving design parameters and associated weightings and structural parameters (e.g., such as from the input module 101, as described herein); a step 620 that includes generating a candidate blade geometry based on the one or more structural parameters (e.g., such as operating the blade generation module 120 as described herein); a step 630 that includes calculating blade performance parameters (e.g., such as operating the performance analysis module 130 as described herein); and a step 640 that includes conducting an optimization routine (e.g., such as operating the optimization module 110 as described herein). The step 640 can further include: (A) a step 641 that includes comparing the calculated blade parameters to the received design parameters based on the associating weighting; (B) a step 642 that includes adjusting the structural parameters and generating, via the blade generation routine, one or more new candidate blade geometries; (C) a step 643 that includes calculating, using the performance analysis routine, the blade parameters of the one or more new candidate blade geometries; and (D) a step 644 that includes repeating steps 641, 642, and/or 643 as appropriate until minima design parameters are found based on the associated weightings. A person skilled in the art will recognize that in this flowchart 600, and throughout the application in general, to the extent references to parameters or geometries are singular or plural, such references are not limiting. Thus, even if it is described that certain parameters must be met, in some instances those parameters may be a single parameter.

Figure 7:
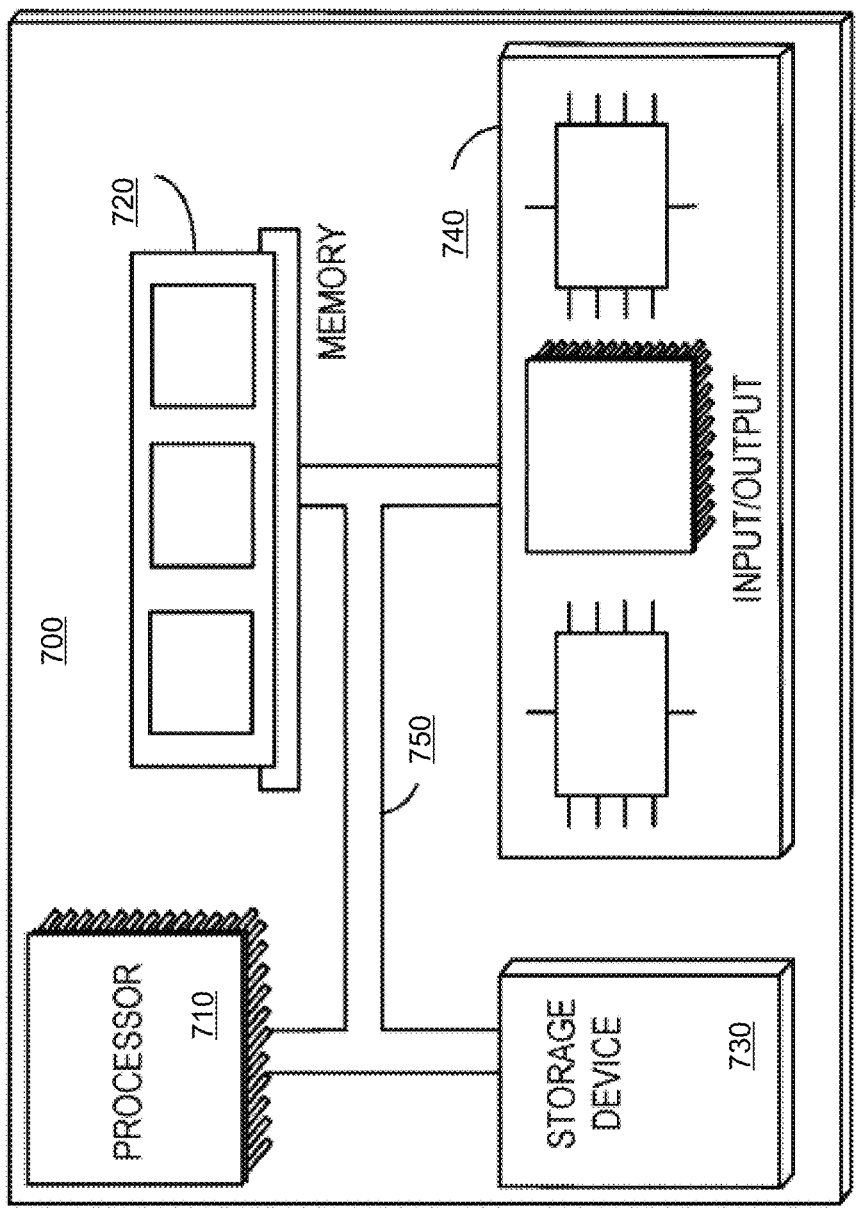
FIG. 7 is a block diagram of one exemplary embodiment of a computer system for use in conjunction with the present disclosures.

FIG. 7 is a block diagram of one exemplary embodiment of a computer system 700 upon which the present disclosures can be built, performed, trained, etc. For example, referring to FIGS. 1 to 6, any modules or systems can be examples of the system 700 described herein, for example the optimization system 1 or computer-implemented system 2 and any of the associated modules or routines described therein. The system 700 can include a processor 710, a memory 720, a storage device 730, and an input/output device 740. Each of the components 710, 720, 730, and 740 can be interconnected, for example, using a system bus 750. The processor 710 can be capable of processing instructions for execution within the system 700. The processor 710 can be a single-threaded processor, a multi-threaded processor, or similar device. The processor 710 can be capable of processing instructions stored in the memory 720 or on the storage device 730. The processor 710 may execute operations such as generating candidate blade geometries 220, calculating performance parameters 341, 342, 343, comparing performance parameters 341, 342, 343 to weighted design parameters and adjusting structural parameters 12 based on the comparing, among other features described in conjunction with the present disclosure.

The memory 720 can store information within the system 700. In some implementations, the memory 720 can be a computer-readable medium. The memory 720 can, for example, be a volatile memory unit or a non-volatile memory unit. In some implementations, the memory 720 can store information related to various airfoils, structural parameters, performance parameters, and optimization landscapes, among other information.

The storage device 730 can be capable of providing mass storage for the system 700. In some implementations, the storage device 730 can be a non-transitory computer-readable medium. The storage device 730 can include, for example, a hard disk device, an optical disk device, a solid-date drive, a flash drive, magnetic tape, and/or some other large capacity storage device. The storage device 730 may alternatively be a cloud storage device, e.g., a logical storage device including multiple physical storage devices distributed on a network and accessed using a network. In some implementations, the information stored on the memory 720 can also or instead be stored on the storage device 730.

The input/output device 740 can provide input/output operations for the system 700. In some implementations, the input/output device 740 can include one or more of network interface devices (e.g., an Ethernet card), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 740 can include driver devices configured to receive input data and send output data to other input/output devices, e.g., a keyboard, a printer, and/or display devices. In some implementations, mobile computing devices, mobile communication devices, and other devices can be used.

In some implementations, the system 700 can be a microcontroller. A microcontroller is a device that contains multiple elements of a computer system in a single electronics package. For example, the single electronics package could contain the processor 710, the memory 720, the storage device 730, and/or input/output devices 740.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, a composition of matter effecting a machine readable propagated signal, or a combination of one or more of them.

Various embodiments of the present disclosure may be implemented at least in part in any conventional computer programming language. For example, some embodiments may be implemented in a procedural programming language (e.g., "C"), or in an object-oriented programming language (e.g., "C++"). Other embodiments may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including, by way of non-limiting examples, a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

The embodiments of the present disclosure described above are intended to be merely exemplary; numerous variations and modifications will be apparent to those skilled in the art. One skilled in the art will appreciate further features and advantages of the disclosure based on the above-described embodiments. Such variations and modifications are intended to be within the scope of the present disclosure as defined by any of the appended claims. Accordingly, the disclosure is not to be limited by what has been particularly shown and described, except as indicated by the appended claims. All publications and references cited herein are expressly incorporated herein by reference in their entirety.

What is claimed is:

1. A computer-implemented system for designing and optimizing a propeller blade, the system comprising:
    a processor;
    an input configured to receive one or more design parameters and an associated weighting for at least one parameter of the one or more design parameters;
    a blade generation module configured to receive one or more structural parameters and generate, as an output, at least one candidate blade geometry based on the one or more structural parameters;
    a performance analysis module configured to receive the at least one candidate blade geometry and calculate, as an output:
        (1) one or more aerodynamic parameters of one or more candidate blade geometries of the at least one candidate blade geometry;
        (2) one or more electric power parameters for driving a motor associated with a propeller having blades of the one or more candidate blade geometries of the at least one candidate blade geometry; and
        (3) one or more acoustic noise parameters of the propeller having blades of the one or more candidate blade geometries of the at least one candidate blade geometry; and
    an optimization module configured to:
        (a) interface with the blade generation module, the performance analysis module, and the input;
        (b) compare the output of the performance analysis module to the one or more design parameters based on the associated weighting;
        (c) adjust the one or more structural parameters and receive, from the blade generation module, one or more new candidate blade geometries;
        (d) input the one or more new candidate blade geometries to the performance analysis module;
        (e) repeat (b), (c), and (d) until a minima of the one or more design parameters is found based on the associated weightings; and
        (f) after the minima is found, output the one or more new candidate blade geometries as one or more optimized blade geometries,
    wherein one or more of the one or more aerodynamic parameters, the one or more electric power parameters, and the one or more acoustic noise parameters comprises the one or more design parameters;
    wherein the blade generation module is configured to generate the at least one candidate blade geometry based on a polar moment of inertia constraint.

2. The system of claim 1,
    wherein the blade generation module is configured to interface with one or more databases containing a plurality of airfoil shapes, and
    wherein the blade generation module is configured to construct the one or more candidate blade geometries from one or more airfoil shapes from the one or more databases based on the one or more structural parameters.

3. The system of claim 2,
    wherein the one or more databases contain at least one structural performance parameter for each airfoil shape of the plurality of airfoil shapes, and
    wherein the blade generation module is configured to construct the one or more candidate blade geometries from the plurality of airfoil shapes that satisfy a constraint on the at least one structural performance parameter of the respective airfoil shape of the plurality of airfoil shapes.

4. The system of claim 1,
    wherein the input is configured to receive operating conditions, and
    wherein the performance analysis module is configured to receive the operating conditions and calculate one or more of the one or more aerodynamic parameters, the one or more electric power parameters, or the one or more acoustic noise parameters at the operating conditions.

5. The system of claim 1,
    wherein the input is configured to receive one or more constraints on the one or more structural parameters, and
    wherein the optimization module is configured to adjust the one or more structural parameters based on the constraints.

6. The system of claim 1,
    wherein the input is configured to receive one or more constraints on at least one of the one or more aerodynamic parameters, the one or more electric power parameters, or the one or more acoustic noise parameters, and
    wherein the performance analysis module is configured to only output performance parameters at operational conditions where the one or more constraints are satisfied.

7. A computer-implemented system for designing and optimizing a propeller blade, the system comprising:
    a processor;
    an input configured to receive one or more design parameters and an associated weighting for at least one parameter of the one or more design parameters;
    a blade generation module configured to receive one or more structural parameters and generate, as an output, at least one candidate blade geometry based on the one or more structural parameters;
    a performance analysis module configured to receive the at least one candidate blade geometry and calculate, as an output, one or more performance parameters of the at least one candidate blade geometry; and
    an optimization module having a first mode and a second mode, the optimization module, in the first mode, being configured to:
        generate a plurality of surrogate points by randomly sampling the one or more structural parameters, wherein each surrogate point of the plurality of surrogate points is provided to the blade generation module to generate a new candidate blade geometry;
generate a design space of the plurality of surrogate points by passing each new candidate blade geometry into the performance analysis module, wherein the design space comprises values of the one or more design parameters calculated for each new candidate blade geometry; and
determine one or more local minima of the design space based on the associated weightings of the one or more design parameters, and
the optimization module, in the second mode, configured to determine a global minimum of the design space by using a gradient-informed algorithm to generate new candidate geometries to pass into the performance analysis module and further populate the design space near the one or more local minima until the weighted values of the one or more design parameters converge at an optimized blade geometry at the global minimum,
wherein the one or more performance parameters comprise the one or more design parameters; and
wherein the blade generation module is configured to generate the at least one candidate blade geometry based on a polar moment of inertia constraint.

8. The system of claim 7, wherein the one or more design parameters comprise at least one of one or more aerodynamic parameters, one or more electric power parameters, or one or more acoustic noise parameters.

9. The system of claim 7,
wherein the blade generation module is configured to interface with one or more databases containing a plurality of airfoil shapes, and
wherein the blade generation module is configured to construct the one or more candidate blade geometries from one or more airfoil shapes from the one or more databases based on the one or more structural parameters.

10. The system of claim 9,
wherein the one or more databases contain at least one structural performance parameter for each airfoil shape of the plurality of airfoil shapes, and
wherein the blade generation module is configured to construct the one or more candidate blade geometries from the plurality of airfoil shapes that satisfy a constraint on the at least one structural performance parameter of the respective airfoil shape of the plurality of airfoil shapes.

11. The system of claim 7, wherein the performance analysis module comprises:
an aerodynamic analysis module configured to receive the at least one candidate blade geometry and calculate, as an output, the one or more aerodynamic parameters of one or more candidate blade geometries of the at least one candidate blade geometry;
an electrical analysis module configured to receive the at least one candidate blade geometry and at least one of the one or more aerodynamic parameters and calculate, as an output, the one or more electric power parameters for driving a motor associated with a propeller having blades of the one or more candidate blade geometries of the at least one candidate blade geometry; and
an aeroacoustic analysis module configured to receive the at least one candidate blade geometry and at least one of the one or more aerodynamic parameters and calculate, as an output, the one or more acoustic noise parameters of the propeller having blades of the one or more candidate blade geometries of the at least one candidate blade geometry.

12. The system of claim 7,
wherein the input is configured to receive operating conditions, and
wherein the performance analysis module is configured to receive the operating conditions and calculate one or more of the one or more aerodynamic parameters, the one or more electric power parameters, or the one or more acoustic noise parameters at the operating conditions.

13. The system of claim 7,
wherein the input is configured to receive one or more constraints on the one or more structural parameters, and
wherein the optimization module is configured to adjust the one or more structural parameters based on the constraints.

14. The system of claim 7,
wherein the input is configured to receive one or more constraints on at least one of the one or more aerodynamic parameters, the one or more electric power parameters, or the one or more acoustic noise parameters, and
wherein the performance analysis module is configured to only output performance parameters at operational conditions where the one or more constraints are satisfied.

15. A computer-implemented method for designing and optimizing a propeller blade, the method comprising:
receiving, via an input operated by a processor, one or more design parameters and an associated weighting for at least one parameter of the one or more design parameters;
receiving, via an input operated by a processor, one or more structural parameters;
generating, via a blade generation routine operated by a processor, at least one candidate blade geometry based on the one or more structural parameters;
calculating, using a performance analysis routine operated by a processor, the following blade parameters:
one or more aerodynamic parameters of one or more candidate blade geometries of the at least one candidate blade geometry;
one or more electric power parameters for driving a motor associated with a propeller having blades of the one or more candidate blade geometries of the at least one candidate blade geometry; and
one or more acoustic noise parameters of the propeller having blades of the one or more candidate blade geometries of the at least one candidate blade geometry; and
executing an optimization routine using the processor, the optimization routine comprising the steps of:
a) comparing the calculated blade parameters to the one or more received design parameters based on the associated weighting;
b) adjusting the one or more structural parameters and generating, via the blade generate routine, one or more new candidate blade geometries;
c) calculating, using the performance analysis routine, the blade parameters for each of the one or more new candidate blade geometries;
d) repeating steps (a), (b), and (c) until a minima of the one or more design parameters is found based on the associated weightings; and e) after the minima is found, outputting the one or more new candidate blade geometries as one or more optimized blade geometries, wherein one or more of the one or more aerodynamic parameters, the one or more electric power parameters, and the one or more acoustic noise parameters comprises the one or more design parameters;

wherein the blade generation routine generates the at least one candidate blade geometry based on a polar moment of inertia constraint;

wherein the optimization routine has a first mode and a second mode;

wherein, in the first mode, the optimization routine is:
 generating a plurality of surrogate points by randomly sampling the one or more structural parameters, wherein each surrogate point of the plurality of surrogate points is provided to the blade generation routine to generate a new candidate blade geometry of the one or more new candidate blade geometries,
 generating a design space of the plurality of surrogate points by passing each new candidate blade geometry of the one or more new candidate blade geometries into the performance analysis routine, wherein the design space comprises values of the one or more design parameters calculated for each new candidate blade geometry of the one or more new candidate blade geometries, and
 determining one or more local minima of the design space based on the associated weightings of the one or more design parameters; and wherein, in the second mode, the optimization routine is determining a global minimum of the design space using a gradient-informed algorithm to generate new candidate geometries to pass into the performance analysis routine and further populate the design space near the one or more local minima until the weighted values of the one or more design parameters converge at an optimized blade geometry at the global minimum.

16. The method of claim 15, comprising:
 interfacing, via the blade generation routine, with one or more databases containing a plurality of airfoil shapes, and
 constructing, via the blade generation routine, the one or more candidate blade geometries from one or more airfoil shapes from the one or more databases based on the one or more structural parameters.

17. The method of claim 16,
 wherein the one or more databases contain at least one structural performance parameter for each airfoil shape of the plurality of airfoil shapes, and
 wherein constructing, via the blade generation routine, includes constructing the one or more candidate blade geometries from the plurality of airfoil shapes to satisfy a constraint on the at least one structural performance parameter of the respective airfoil shape of the plurality of airfoil shapes.

18. The method of claim 15, wherein the performance analysis routine comprises:
 receiving, via an aerodynamic analysis routine operated by a processor, the at least one candidate blade geometry and calculating, as an output, the one or more aerodynamic parameters of one or more candidate blade geometries of the at least one candidate blade geometry;
 receiving, via an electrical analysis routine operated by a processor, the at least one candidate blade geometry and at least one of the one or more aerodynamic parameters and calculating, as an output, the one or more electric power parameters for driving a motor associated with a propeller having blades of the one or more candidate blade geometries of the at least one candidate blade geometry; and
 receiving, via an aeroacoustic analysis routine operated by a processor, the at least one candidate blade geometry and at least one of the one or more aerodynamic parameters and calculating, as an output, the one or more acoustic noise parameters of the propeller having blades of the one or more candidate blade geometries of the at least one candidate blade geometry.

19. The method of claim 15, comprising
 receiving, via the input, operating conditions, and
 receiving, via the performance analysis routine, the operating conditions and calculating one or more of the one or more aerodynamic parameters, the one or more electric power parameters, or the one or more acoustic noise parameters at the operating conditions.

20. The method of claim 15, comprising
 receiving, via the input, one or more constraints on the one or more structural parameters, and
 adjusting, via the optimization routine, the one or more structural parameters based on the constraints.

21. The method of claim 15,
 receiving, via the input, one or more constraints on at least one of the one or more aerodynamic parameters, the one or more electric power parameters, or the one or more acoustic noise parameters, and
 wherein the performance analysis routine only outputs performance parameters at operational conditions where the one or more constraints are satisfied.

* * * * *